US006430898B1

United States Patent
Remmers et al.

(10) Patent No.: US 6,430,898 B1
(45) Date of Patent: Aug. 13, 2002

(54) METHOD OF PACKAGING A THERMOPLASTIC COMPOSITION WITH A FILM HAVING A LOW COMPLEX VISCOSITY AND CORRESPONDING PACKAGED ARTICLE

(75) Inventors: Peter Remmers, Hamburg; Joachim Baumung, Melbeck, both of (DE); Michelle M. Chanak, Forest Lake; Kevin W. McKay, White Bear Lake, both of MN (US); Thomas Wittkopf, Vogelsen (DE)

(73) Assignee: H.B. Fuller Licensing & Financing, Inc., St. Paul, MN (US)

( * ) Notice: Subject to any disclaimer, the term of this patent is extended or adjusted under 35 U.S.C. 154(b) by 0 days.

(21) Appl. No.: 09/468,444

(22) Filed: Dec. 21, 1999

Related U.S. Application Data (60) Provisional application No. 60/112,941, filed on Dec. 18, 1998.

(51) Int. Cl.⁷ .............................................. B65B 55/14
(52) U.S. Cl. ........................... 53/440; 53/453; 53/450; 53/140
(58) Field of Search .................... 53/440, 453, 450, 53/127, 122, 140

(56) References Cited

U.S. PATENT DOCUMENTS

| 5,109,892 A | * | 5/1992 | Somers ........................ 53/440 |
| 5,257,491 A | * | 11/1993 | Rouyer et al. ................. 53/440 |
| 5,307,608 A | * | 5/1994 | Muir et al. ..................... 53/440 |
| 5,373,682 A | | 12/1994 | Hatfield et al. |
| 5,401,455 A | | 3/1995 | Hatfield et al. |
| 5,669,207 A | | 9/1997 | Hull |
| 5,715,654 A | | 2/1998 | Taylor et al. |
| 5,987,852 A | * | 11/1999 | Bozich et al. ................. 53/440 |
| 6,044,625 A | * | 4/2000 | Waver et al. .................. 53/440 |
| 6,155,029 A | * | 12/2000 | Jain ............................. 53/440 |

FOREIGN PATENT DOCUMENTS

EP          0 557 573 A2     9/1993

* cited by examiner

*Primary Examiner*—Rinaldi I. Rada
*Assistant Examiner*—Sameh Tawfik
(74) *Attorney, Agent, or Firm*—Bin Su; Allison A. Johnson (57) ABSTRACT

The present inventors have discovered that an easily measured property, namely complex viscosity, directly relates to physical film compatibility and have further identified a class of polyolefin materials, which are particularly amenable to exhibiting such properties. It is important to note that this discovery assumes that the film material is first chemically compatible with the thermoplastic composition to be packaged.

The invention is particularly useful for low viscosity thermoplastic compositions having a Brookfield viscosity of less than about 10,000 cPs at 350° F., such as pressure sensitive hot melt adhesive compositions which are typically applied by melting the packaged adhesive composition in a melt tank wherein the melt tank lacks an active mixing means. The invention is also useful for hot melt adhesives that are applied by application means that are very sensitive to inhomogeneity of the combination of molten hot melt adhesive and molten packaging material such as spraying, screen printing, foaming and gravure coating hot melt application techniques.

25 Claims, 2 Drawing Sheets

FIG.1

FIG.2

METHOD OF PACKAGING A THERMOPLASTIC COMPOSITION WITH A FILM HAVING A LOW COMPLEX VISCOSITY AND CORRESPONDING PACKAGED ARTICLE

This application claims priority from Provisional application Ser. No. 60/112,941, filed Dec. 18, 1998.

FIELD OF THE INVENTION

The present invention relates to an improvement in the method of packaging thermoplastic compositions, particularly hot melt adhesive compositions. The method comprises substantially surrounding a portion of adhesive composition with a plastic packaging film having a relatively low complex viscosity at low temperatures. The packaging material is meltable together with the adhesive composition, blendable into the molten adhesive composition, and does not adversely affect the adhesive properties to the extent that it is unnecessary to remove the packaging material from the hot melt adhesive composition prior to usage. The invention is particularly useful for certain low viscosity pressure sensitive adhesive compositions, that are typically applied by melting the packaged adhesive composition in a melt tank. More particularly, the invention is useful for hot melt adhesives that are applied by application means that are very sensitive to inhomogeneity of the combination of molten hot melt adhesive and molten packaging material such as spraying, screen printing, bead applicators and gravure coating hot melt application techniques.

BACKGROUND OF THE INVENTION

Hot melt adhesives (HMA's) are solid at room temperature and are generally applied to a substrate while in a molten state. Hot melt adhesives are typically characterized as hot melt pressure sensitive adhesives (HMPSA's,) which are tacky to the touch even after the adhesive has solidified and non-tacky hot melt adhesives which will be denoted as simply "HMA's". HMA's have been packaged in a variety of forms ranging from small pellets that can be vacuum fed into a melting device, to drum sized quantities. The packaging of HMA's has typically been unproblematic, since after the adhesive is solidified, it will maintain its shape and not adhere to the container, other pieces of hot melt, the operator's hands, machinery, etc. until remelted.

HMPSA's on the other hand, present a variety of challenges. Historically, these adhesives were, and continue to be, provided in the form of blocks. Due to the tacky nature of these materials, there are problems associated with handling and packaging them. The solid HMPSA blocks not only stick to each other and adhere to the operator's hands and mechanical handling devices, but they also pick up dirt and other contaminants. Additionally, certain high tack formulations result in blocks that will deform or cold flow unless supported during shipment. The needs and advantages for providing tackless or nonblocking hot melt pressure sensitive adhesive forms and packages are apparent and various ways of accomplishing this have been developed.

Several references relate to the use of certain low viscosity materials, particularly waxes, for use as a non-tacky coating. The coating may be coextruded onto a strand of HMPSA and squeeze-cut to form pillows, applied to a mold that is subsequently filled with hot melt adhesive, or provided in the form of an aqueous dispersion which upon evaporation of the water leaves a nontacky powder coating or residue on the adhesive surface.

Specifically, EP 0 557 573 A2 relates to a packaging composition for cold-flowing adhesive compositions wherein the composition contains an intimate blend of styrene-isoprene-styrene block copolymer; an aromatic hydrocarbon resin, a suitable mineral oil, a wax, and an antioxidant/stabilizer.

Other references employ plastic packaging materials that substantially surround the adhesive composition. For example, Rouyer et al., U.S. Pat. No. RE 36,177 reissued April 6, 1999 teaches a method of packaging an adhesive composition in a plastics packaging material. The claims of Rouyer are directed to selecting a plastic packaging material having a softening point below about 120° C., and having physical characteristics which are compatible with and do not substantially adversely affect the adhesive characteristics of a molten mixture of said adhesive and said material and whereby the mixture is substantially compatible with the operation of hot melt application equipment. Subsequent patents employing plastic packaging materials in the adhesive field include U.S. Pat. No. 5,715,654; U.S. Pat. No. 5,669,207; U.S. Pat. No. 5,401,455; U.S. Pat. No. 5,373,682.

SUMMARY OF THE INVENTION

The present inventors have discovered that an easily measured property, namely complex viscosity, directly relates to physical film compatibility and have further identified a class of polyolefin materials that exhibit such properties. It is important to note that this discovery assumes that the film material is first chemically compatible with the thermoplastic composition to be packaged, consistent with the teachings of Rouyer et al.

The invention is particularly useful for low viscosity thermoplastic compositions having a Brookfield viscosity of less than about 10,000 cPs at 350° F., such as pressure sensitive hot melt adhesive compositions which are typically applied by melting the packaged adhesive composition in a melt tank wherein the melt tank lacks an active mixing means. The invention is also useful for hot melt adhesives that are applied by application means that are very sensitive to inhomogeneity of the combination of molten hot melt adhesive and molten packaging material such as spraying, screen printing, bead applicators and gravure coating hot melt application techniques.

Accordingly, one aspect of the present invention is an improved method of packaging a thermoplastic composition in a film material wherein the film material is selected such that it is similar to the complex viscosity of thermoplastic composition being packaged, yet high enough in complex viscosity such that the film exhibits sufficient mechanical strength to serve its intended packaging function. Preferably the difference in complex viscosity between the thermoplastic composition and the film at the application temperature is less than about 15000 poise and more preferably less than about 10,000 poise at the application temperature of the adhesive. Most preferably the film exhibits a relatively flat complex viscosity curve as a function of temperature, similar to the curve of the corresponding adhesive that is being packaged. Thus, the film is generally not comprised of a wax-like material having a molecular weight (Mw) of less than about 40,000 or other materials that generally rise steeply in viscosity at lower temperatures, ranging from about 70° C. to about 100° C. Hence, the complex viscosity of the film is typically less than 100,000 Pa*s at 90° C. and most preferably less than 100,000 Pa*s at 70° C. to 80° C.

In another embodiment, the present invention relates to a packaged thermoplastic composition comprising a hot melt adhesive composition, surrounded by a plastic packaging film material wherein the complex viscosity of the film material is less than 100,000 Pa*s. at about 90° C. and preferably less than 100,000 Pa*s at 70–80° C.

In another embodiment, the present invention relates to a thermoplastic composition surrounded by a plastic packaging film wherein the film material has a melt index greater than 20 g/10 min. and preferably greater than about 30 g/10 min. at 190° C.

In another embodiment, the present invention relates to a thermoplastic composition surrounded by a plastic packaging film wherein the film material comprises certain homogeneous ethylene/α-olefin interpolymers. The applicants have found that the complex viscosity of low density homogeneous ethylene/α-olefin interpolymer based films is substantially lower than a higher density film having the same melt index. Accordingly, low density homogeneous ethylene/α-olefin interpolymers film materials are particularly preferred.

DETAILED DESCRIPTION OF THE INVENTION

The present invention is useful for packaging a variety of thermoplastic compositions, particularly hot melt adhesives, wherein the packaging material need not be removed from the thermoplastic composition prior to use. These types of methods and corresponding packaged articles may be described as "inclusion" methods or packages since the packaging material is intended to be included are part of the thermoplastic composition. Details concerning various methods, suitable hot melt adhesive compositions, types of packages, types of film materials employed, etc. (in the absence of the claimed improvement) may be found for example in Rouyer et al., U.S. Pat. No. 5,257,491, issued Nov. 2, 1993; Hull, U.S. Pat. No. 5,669,207 issued Sep. 23, 1997; and Taylor et al., U.S. Pat. No. 5,715,654 issued Feb. 10, 1996; and U.S. Pat. Nos. 5,401,455 and 5,373,682 issued to Hatfield; all incorporated herein by reference.

In general, the thermoplastic composition may be sufficiently solidified prior to being surrounded by the packaging film. This can be accomplished by pouring the molten adhesive into a releasable coated mold. Once cooled the adhesive "brick" can be removed from the mold and covered with the packaging film to form a package. Alternatively, and particularly to expedite the cooling process, the adhesive can be formed into a plurality of pieces such as pillows or pellets. The adhesive pillows are generally detackified on the surface by coextruding the pressure sensitive adhesive with a nontacky thermoplastic coating. Employing various pelletizing aids in combination with underwater pelletizing processes can also detackify pillows and pellets. Alternatively, pieces of hot melt pressure sensitive adhesive can be temporarily detackified by means of cooling the adhesive surface to a temperature wherein the storage modulus (G') is greater than about $1 \times 10^7$ dynes/cm$^2$. In other embodiments, the adhesive may be packaged molten. The film may be formed into a tubular shape and that is typically cooled with water or refrigerant while being filled to prevent the molten adhesive from melting through the film.

Regardless of the method, the final packaged typically contains at least 200g of adhesive and preferably ranges from about 400–800 g packages to about 2000–5,000 g. The amount of packaging material employed with respect to the weight of the adhesive is typically less than 5 wt-%, preferably less than about 2 wt-%, more preferably less than about 1 wt-%, and most preferably less than about 0.5 wt-%.

The hot melt adhesive is preferably pressure sensitive having a storage modulus of less than about $5 \times 10^6$ dynes/cm$^2$, since it is typically unproblematic to package non-pressure sensitive hot melt adhesives. Pressure sensitive adhesive compositions have a storage modulus, G', at 25° C. of less than about $5 \times 10^6$ dynes/cm$^2$, in accordance with the Dahlquist criteria. The invention is particularly well suited for packaging low viscosity pressure sensitive hot melt adhesive compositions. The adhesive typically has a viscosity less than 10,000 cPs, preferably less than about 5,000 cPs, and more preferably less than about 3,000 cPs at 350° F. (177° C.). Low viscosity hot melt adhesives as well as some higher viscosity compositions are typically applied by melting the (packaged) adhesive in a melt tank. The melt tank may have a recirculation pump, yet is absent of any active mixing means. The molten adhesive is then pumped through one or more hoses to the adhesive applicator such as a slot coater, spray nozzle, bead applicator, screen printer, or gravure roll coater.

The present invention relates to selecting a film that exhibits a complex viscosity similar to that of the adhesive composition to be packaged. Preferably, the complex viscosity is similar at both the application temperature as well as at lower temperatures. Application temperatures for hot melt adhesives range from about 100° C. to about 180° C., preferably range from about 100° C. to about 150° C., and more preferably range from about 100° C. to about 120° C.

The complex viscosity at application temperature is important for melt miscibility of the molten mixture of adhesive and film, whereas the complex viscosity at slightly lower temperatures than application temperature is surmised to relate to the processability of the adhesive. The difference in complex viscosity between the adhesive and the film material is preferably less than about 15,000 poise and more preferably less than 10,000 poise at the application temperature of the adhesive The films employed in the present invention also exhibit a relatively low complex viscosity at as low of a temperatures. The complex viscosity of the film material may be provided, for example, by the supplier of the film, or measured by the adhesive manufacturer. The complex viscosity is less than 100,000 Pa*s, preferably less than about 80,000 Pa*s, more preferably less than about 50,000 Pa*s, even more preferably less than about 20,000 Pa*s, and most preferably less than about 10,000 Pa*s at a temperature of about 80° C. More preferably the film exhibits the desired complex viscosity at 75° C., and even more preferably at 70° C. At a higher complex viscosity the film tends to accumulate on the adhesive filter causing high pressures within the hoses which transport the molten adhesive from the melt tank to the adhesive applicator. Pressure surges resulting in uneven adhesive coating weight distribution can occur as the film is sporadically forced through the filter. Depending on the severity of film accumulation on the filter, the entire line may need to be shut done to replace the filter. In contrast, at too low of a complex viscosity, for example less than about 300 Pa*s (3000 poise, 300,000 cps), the film typically does not possess sufficient film strength to be made into a preformed roll good. Hence, preferably the complex viscosity is at least about 400 Pa*s or greater. However, in such instances, the material may be employed by forming a continuous coating in-line, particularly with the non-contact slot coating method described in U.S. Pat. No. 5,827,252; incorporated herein by reference In this method a molten/flowable thermoplastic coating composition is provided having a complex viscosity at the coating temperature ranging from about 500 poise at about 1,000 radians/second and ranging from about 100 to about 1000 poise at 1 radian/second; the thermoplastic composition is dispensed as a continuous coating from a coating device. The continuous coating formed is suspended between the coating device and the surface being coated and subsequently contacted with the pressure sensitive adhesive surface. Either the mass of adhesive or the coating head can be advanced to coat the entire exterior of the pressure sensitive adhesive mass.

The softening temperature (Mettler or Ring & Ball) or melting point (DSC) of the film must be below the application temperature of the adhesive. In the case of the high complex viscosity film materials exemplified in the prior art, it was important that the melt point of the film be substantially below the application temperature of the hot melt adhesive to insure melt miscibility. Although films having a softening or melting point of less than about 120° C. are preferred, particularly for adhesive compositions intended to be applied at low application temperatures, higher softening or melt point films may also be employed provided the complex viscosity is within the desired range.

The effects of the film can be measured by comparing the properties of the unpackaged adhesive composition to the properties of the mixture of the adhesive composition and film. The film shall not unintentionally detrimentally affect the critical adhesive properties. The critical properties will vary depending on the final intended use for the adhesive. Detrimental affects are characterized as a molten viscosity change of greater than about 30%. Preferably, the viscosity of the adhesive will change by less than about 20%, more preferably less than about 10%. The loop tack values and/or peel values (typically 180° peels to stainless steel) also preferably change by less than about 30%, preferably less than about 20%, and most preferably less than about 10% of the value. Differences of less than about 5–10% cannot typically be detected with current test methods and equipment. These properties are not only tested initially, but are also aged and retested over time. For instance, the viscosity may be tested over a 100 hour period, every 24 hours, comparing the adhesive stability to a sample of unpackaged adhesive. The loop tack values and peel values may be tested over a one-week or two-week period with the values not decreasing by more than about 20% over the course of aging. It is most preferable that the film material has no effect or a positive effect on the adhesive properties.

One class of film materials, which are particularly amenable to exhibiting such a low complex viscosity at low temperatures, are homogeneous ethylene/α-olefin interpolymers prepared using single-site or metallocene catalysts. Homogeneous ethylene/(α-olefin interpolymers are characterized as having a narrow molecular weight distribution and a uniform short-chain branching distribution. In the case of substantially linear ethylene polymers, such homogeneous ethylene polymers are further characterized as having long chain branching. Substantially linear ethylene polymers are commercially available from The Dow Chemical Company as Affinity™ polyolefin plastomers, which are produced using Dow's Insite™ technology. Homogeneous linear ethylene polymers are available from Exxon Chemical Company under the trade name Exacts® plastomers.

The packaging film material of the present invention may comprise at least one homogeneous ethylene/α-olefin interpolymer, which is an interpolymer of ethylene and at least one $C_3$–$C_{20}$ α-olefin. The term "interpolymer" is used herein to indicate a copolymer, or a terpolymer, or a higher order polymer. That is, at least one other comonomer is polymerized with ethylene to make the interpolymer.

The homogeneous ethylene/α-olefin interpolymer is a homogeneous linear or substantially linear ethylene/α-olefin interpolymer. By the term "homogenous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer has a melting peak greater than 115° C. (such as is the case of polymers having a density greater than 0.940 g/cm³), it does not additionally have a distinct lower temperature melting peak.

In addition or in the alternative, the homogeneity of the polymer may be described by the SCBDI (Short Chain Branching Distribution Index) or CDBI (Composition Distribution Breadth Index), which are defined as the weight percent of the polymer molecules having a comonomer content within 50% of the median total molar comonomer content. The SCBDI of a polymer is readily calculated from data obtained from techniques known in the art, such as, for example, temperature rising elution fractionation (abbreviated herein as "TREF"), which is described, for example, in Wild et al., Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.). The SCBDI or CDBI for the homogeneous ethylene/α-olefin interpolymers useful in the invention are preferably greater than 50%, more preferably greater than 70%, with SCBDI's and CDBI of greater than 90% being easily attained.

The homogeneous ethylene/α-olefin interpolymers useful in the invention are characterized as having a narrow molecular weight distribution, the $M_w/M_n$ being less than 4, preferably, less than about 3, more preferably from 1.5 to 2.5, and most preferably from 1.8 to 2.2, most preferably about 2.0.

Substantially linear ethylene interpolymers are homogeneous interpolymers having long chain branching. Due to the presence of such long chain branching, substantially linear ethylene interpolymers are further characterized as having a melt flow ratio ($I_{10}/I_2$) which may be varied independently of the polydispersity index, and the like, the molecular weight distribution $M_w/M_n$. This feature accords substantially linear ethylene polymers with a high degree of processability despite a narrow molecular weight distribution.

It is noted that substantially linear interpolymers useful in the invention differ from low density polyethylene prepared in a high pressure process. In one regard, whereas low density polyethylene is an ethylene homopolymer having a density of from 0.900 g/cm³ to 0.935 g/cm³, the homogeneous linear and substantially linear interpolymers useful in the invention require the presence of a comonomer to reduce the density to the range of from 0.855 g/cm³ to 0.910 g/cm³.

The long chain branches of substantially linear ethylene interpolymers have the same comonomer distribution as the interpolymer backbone and can be as long as about the same length as the length of the interpolymer backbone. When a substantially linear ethylene/α-olefin interpolymer is employed in the practice of the invention, such interpolymer will be characterized as having an interpolymer backbone substituted with from 0.01 to 3 long chain branches per 1000 carbons. Methods for determining the amount of long chain branching present, both qualitatively and quantitatively, are known in the art.

The molecular weight of the ethylene/α-olefin interpolymer will be selected on the basis of the desired performance attributes of the film material. Typically, however, the ethylene/α-olefin interpolymer will preferably have a number average molecular weight of at least 3,000, preferably at least 5,000. Typically, the ethylene/α-olefin interpolymer will preferably have a number average molecular weight of no more than 100,000, preferably no more than 60,000, and even more preferably less than 40,000.

Ultra-low molecular weight ethylene/α-olefin interpolymers are either ethylene homopolymers or interpolymers of ethylene and a $C_3$–$C_{20}$ α-olefin. Such interpolymers are surmised to be particularly useful as diluents in combination with higher molecular weight metallocene polyolefins and for low application temperature (<135° C.) applied compositions. When the ethylene/α-olefin interpolymer has an ultra-low molecular weight, and the like, a number average molecular weight less than 11,000, the ethylene/α-olefin interpolymer leads to a low polymer viscosity but is characterized by a peak crystallization temperature which is greater than that of corresponding higher molecular weight materials of the same density. The ultra-low molecular weight ethylene/α-olefin interpolymers will have a number average molecular weight less than about 6000, preferably less than about 5000. Such homogeneous interpolymers will typically have a number average molecular weight of at least about 800, preferably at least about 1300.

When the ethylene/α-olefin interpolymer has an ultra-low molecular weight, and the like, a number average molecular weight less than 11,000, the ethylene/α-olefin interpolymer leads to a low polymer viscosity but is characterized by a peak crystallization temperature which is greater than that of corresponding higher molecular weight materials of the same density.

The density of the ethylene/α-olefin interpolymer will likewise be selected on the basis of the desired performance attributes of the packaging film. Typically, the ethylene/α-olefin interpolymer will have a density of less than about 0.910 g/cm$^3$, preferably less than about 0.900 g/cm$^3$, more preferably less than about 0.890 g/cm$^3$, and even more preferably less than about 0.885 g/cm$^3$. The ethylene/α-olefin will preferably have a density ranging from about 0.855 g/cm$^3$ to about 0.900 g/cm$^3$ and more preferably ranging from about 0.860 g/cm$^3$ to about 0.885 g/cm$^3$.

In another embodiment, a film material comprises a first homogeneous ethylene/α-olefin interpolymer blended with a second homogeneous ethylene/α-olefin interpolymer, wherein the first and second interpolymers differ in number average molecular weight by at least about 5000, preferably at least about 10,000, and more preferably at least about 20,000.

In addition or in the alternative, the first homogeneous ethylene/α-olefin interpolymer may be blended with a second homogeneous ethylene/α-olefin interpolymer, wherein the first and second interpolymers differ in density by at least about 0.005 g/cm$^3$, preferably by at least about 0.01 g/cm$^3$.

In one embodiment, the packaging film composition will comprise a blend of two homogeneous ethylene/α-olefin, the first interpolymer having a density of about 0.870 g/cm$^3$ or less and the second interpolymer having density greater than about 0.900 g/cm$^3$. In this instance, the metallocene polyolefin blend will fall within the density and MI constraints previously described.

Other types of thermoplastic materials that exhibit the desired complex viscosity and thus may be employed as the packaging film for use in the present invention include ethylene-vinyl acetate (EVA), ethylene-n-butyl acrylate (EnBA), ethylene methacrylate, (EMA), ethylene acrylic acid (EEA), as well as polyolefin homopolymers, copolymers and terpolymers polymerized by conventional polymerization techniques. Many of such film materials typically have softening or melting point less than 120° C. However, other grades having a softening or melting point greater than 120° C. may also exhibit the desired complex viscosity. Commercially available film materials having higher softening or melting points, yet low complex viscosity's include amorphous polyalphaolefins such as RT 2385 and RT 2535 (Creanova) and Vestoplast 703, 608, 620 and V3639 (Huls); low molecular weight polyolefins such as Epolene C-13, C-14, C-17 (Eastman), as well as film materials having a high concentration of polypropylene. Preferably, such materials have a molecular weight (Mw) of greater than 40,000, more preferably greater than 50,000, and even more preferably greater than about 100,000.

In general, the film materials useful in the present invention may comprise a single thermoplastic material, or blends thereof, provided the desired complex viscosity criteria is achieved.

In the case of blown films, the polymer, or blend of polymers, will typically have a melt index (MI) ranging from about 0.1 to 100 g/10 min., more preferably ranging from about 5 to about 60 g/10 min., and most preferably ranging from about 20 to about 60 g/10 min. Blown films formed from polymers having a MI greater than about 10 g/10 min. typically require special processing conditions. For cast films, the film materials may have a higher melt index, for example ranging as high as 1500 g/10 min., preferably less than about 750 g/10 min., more preferably less than about 500 g/10 min., and most preferably greater than about 200 g/10 min. In terms of molten viscosity, the film materials preferably have a viscosity of greater than about 300,000, more preferably greater than about 350,000 and most preferably greater than about 400,000 cps at 325° F. Further, in the case of films formed in-line, the film material may exhibit even higher melt indices corresponding to Brookfield molten viscosity's as low as about 2,000 cPs at 350° F. However, since film strength greatly diminishes at higher melt indices in excess of about 200 g/10 min., materials of this sort are suitable primarily as a nontacky covering for the adhesive and not necessarily intended as a conventional package for methods in which film strength is important, for example to contain loose pillows or pellets.

The pressure sensitive adhesive compositions of the present invention typically comprise at least one thermoplastic polymer, at least one tackifying resin, and a plasticizing oil. However, if a liquid tackifying resin is employed or the thermoplastic polymer component has a relatively low storage modulus, the composition may consist entirely of polymer(s) and tackifying resin(s).

The thermoplastic polymers for use in the packaged adhesive block copolymers; homopolymers, copolymers and terpolymers of $C_2$–$C_8$ alphaolefins; homogeneous ethylene-alpha-olefin interpolymers and styrenic, vinylic and grafted versions thereof, as well as certain polyamides and polyesters, particularly those which are water dispersible or water soluble. The $C_2$–$C_8$ alphaolefin based polymers generally have a relatively low density, less than about 0.900 g/cm$^3$, preferably less than about 0.890 g/cm$^3$, and more preferably less than about 0.880 g/cm$^3$. Higher density polymers are typically too crystalline to serve as the base polymer for a pressure sensitive adhesive composition.

The concentration of thermoplastic polymer employed in the hot melt adhesive ranges from about 5 wt-% to as much as 90 wt-% and depends primarily on the molecular weight (Mw) which relates to the melt index (MI) and/or solution viscosity of the thermoplastic polymer(s) utilized. For extrudable grade adhesives, the thermoplastic polymer typically ranges from about 10 wt-% to about 70 wt-%, more preferably from about 10 wt-% to about 60 wt-% and most preferably from about 20 wt-% to about 60 wt-% in the adhesive. In contrast, hot melt adhesives which are typically applied by slot-coating, spiral spraying, melt-blowing, engraved roller and other traditional application techniques tend to be lower in viscosity. Accordingly, such adhesive compositions are typically comprised of lower polymer concentrations ranging from about 10 wt-% to about 50 wt-%, preferably from about 10 wt-% to about 40 wt-%, and more preferably from about 10 wt-% to about 30 wt-%.

Relatively high molecular weight polymers, those having a molecular weight of greater than about 200,000 g/mole, are typically employed at concentrations ranging from about 2 wt-% to about 30 wt-%, and preferably from about 5 wt-% to about 20 wt-%. In contrast, lower molecular weight polymers, those having a melt index of about 200 g/10 min. or greater, may be employed at higher concentrations.

A wide variety of block copolymers are useful in the packaged hot melt adhesive present invention including A-B-A triblock structures, A-B diblock structures, $(A-B)_n$ radial block copolymer structures, as well as branched and grafted versions of such, wherein the A endblock is a non-elastomeric polymer block, typically comprising polystyrene and/or vinyl, and the B block is an unsaturated conjugated diene or hydrogenated version thereof. In general, the B block is typically isoprene, butadiene, ethylene/butylene (hydrogenated butadiene), ethylene/propylene (hydrogenated isoprene), and mixtures thereof.

In general, block copolymers range in A block (styrene or vinyl) content from 0, as in the case of multi-arm $(EP)n^8$ 100% diblock polymers to about 50 wt-%. Typically, the non-elastomeric A block concentration ranges from about 10 wt-% to about 45 wt-% with respect to the weight of the block copolymer. Block copolymers also range in diblock contents from 0, wherein the block copolymer is 100% coupled, to 100% diblock, as previously mentioned. Further, the molecular weight of block copolymer is related to the solution viscosity at 77° F. (25° C.) of a given weight of polymer in toluene. The amount of block copolymer employed for determining the solution viscosity depends on the molecular weight. For relatively high molecular weight block copolymers, the solution viscosity is typically expressed as a function of a 10 wt-% block copolymer solution, whereas for more conventional and lower molecular weight block copolymers, a 25 wt-% block copolymer solution is employed. A preferred high molecular weight block copolymer is a substantially saturated A-B-A block copolymer, wherein the A block is polystyrene or vinyl and the B block is ethylene-butylene, ethylene-propylene or mixtures thereof, such as Kraton™ G-1651.

The preferred diblock content of the block copolymer depends on the intended adhesive attributes. For cohesively failing adhesives or when it is desired to employ a high concentration of thermoplastic polymer, relatively high diblock contents are desired. However, the majority of block copolymer based pressure sensitive adhesives employ block copolymers having a relatively low diblock content, less than 50 wt-% diblock with respect to the weight of the block copolymer.

Commercial embodiments include the Kraton® D and G series block copolymers, available from Shell Chemical Company (Houston, Tex.), Europrenee® Sol T block copolymers available from EniChem (Houston, Tex.), Vector® block copolymers available from Exxon (Dexco) (Houston, Tex.), as well as others. Branched versions such as Kraton® TKG-101 having a styrene-ethylene/butylene-styrene backbone with isoprene side chains as well Kraton® G-1730, an S-EP-S-EP block copolymer having a terminal ethylene-propylene block rather than terminal polystyrene, are also useful for increasing tack.

Amorphous polyolefins or amorphous polyalphaolefins (APAO) are homopolymers, copolymers, and terpolymers of $C_2$–$C_8$ alphaolefins. These materials as typically polymerized by means of processes, which employ Ziegler-Natta, and peroxide catalysts result in a relatively broad molecular weight distribution. Commercially available amorphous polyalphaolefins include Rextac® and REXFlex® propylene based homopolymers, ethylene-propylene copolymers and butene-propylene copolymers available from Rexene (Dallas, Tex.) as well as Vestoplast® alpha-olefin copolymers available from Huils (Piscataway, N.J.).

Homogeneous ethylene/α-olefin interpolymers are useful as base polymers for pressure sensitive adhesives in addition to being the preferred film material. Homogeneous ethylene/α-olefin interpolymers differ from amorphous polyolefins also described as amorphous polyalphaolefins (APAO), with regard to homogeneity, molecular weight distribution ($M_w$/$M_n$), as well as comonomer (α-olefin) content. Amorphous polyolefins are homopolymers, copolymers, and terpolymers of $C_2$–$C_8$ -olefins which are typically polymerized by means of processes which employ Ziegler-Natta catalysts, resulting in a relatively broad molecular weight distribution, typically greater than 4. In contrast, the homogeneous ethylene/α-olefin interpolymers are characterized as having a narrow molecular weight distribution. The homogeneous ethylene/α-olefins have a $M_w$/$M_n$ of less than 4, preferably less than 3, more preferably from 1.5 to 2.5, even more preferably from 1.8 to 2.2, and most preferably about 2.0. Further, whereas amorphous polyolefins produced from Ziegler-Natta catalysis typically have an α-olefin concentration greater than 50 wt-%, homogeneous ethylene/α-olefin interpolymers useful in the present invention are predominantly ethylene, having a greater ethylene content than comonomer content.

Additionally, or in the alternative, the adhesive composition of the present invention may comprise an amorphous water sensitive thermoplastic polymer. One particularly preferred class of amorphous water sensitive thermoplastic polymers is water dispersible copolyesters available from Eastman Chemical Company (Kingsport, Tenn.) under the tradename Eastman AQ. These water dispersible copolyesters are saline and body fluid insoluble and are typically low molecular weight, branched copolyesters containing sulfonomer. Information containing the chemical synthesis of such polyesters may be found in U.S. Pat. Nos. 5,543,488 and 5,552,495, incorporated herein by reference. Lighter color and low odor modifications of such water dispersible copolyesters are also contemplated, particularly for non-woven applications in which odor and color tend to be important characteristics. The preferred water dispersible copolyesters are those which exhibit an intrinsic viscosity of about .6 IV or less and more preferably about 0.4 IV or less and most preferably for low application temperature hot melt adhesives, 0.2 IV or less. In terms of molten viscosity, these ranges correlate to a Brookfield viscosity ranging from about 5,000 to about 40,000 cPs at 350° F. (177° C.).

Additionally, the hot melt adhesive compositions of the present invention may further comprise other compatible polymers which tend to be too crystalline to use alone as the base polymer in a pressure sensitive adhesive composition. Representative examples include a variety of crystalline polyolefins, particularly homopolymer, copolymers are terpolymers or ethylene and propylene such as medium and high density polyethylene, propylene and homogeneous ethylene/alpha-olefin interpolymer having a density greater than about 0.890 g/cm$^3$; ethylene vinyl acetate (EVA) copolymers, copolymers of ethylene and methyl acrylate (methacrylates as well as acrylates) also known as EMA, copolymers of ethylene and n-butyl acrylate also known as EnBA, as well as others.

Tackifying resins are added to the adhesive compositions to increase tack, peel values, loop tack values and specific adhesion. The adhesive composition of the present invention preferably comprises at least one tackifying resin in an amount ranging from about 10 wt-% to 70 wt-%, preferably from about 30 wt-% to about 65 wt-%, and more preferably from about 40 wt-% to about 65 wt-%. In some instances, wherein the polymer itself exhibits sufficient tack, the present invention also contemplates adhesive pellets comprising no tackifying resin at all. The Applicants surmise certain neat polymers, particularly those having a relatively low molecular weight, in combination with a high alpha-olefin content or alternatively high diblock content (in the case of block copolymer) would exhibit such properties.

In general, tackifying resins useful herein include aliphatic, cycloaliphatic and aromatic hydrocarbons and modified hydrocarbons and hydrogenated derivatives; terpenes and modified terpenes and hydrogenated derivatives; rosins and modified rosins and hydrogenated derivatives; and mixtures thereof. Solid tackifying resins have a ring and ball softening point of between about 70° C. and 150° C. whereas liquid tackifying resins are flowable at ambient temperature. Commercially available liquid tackifying resins include Escorez® 2520, a hydrocarbon resin with a pour point of 20° C., available from Exxon Chemical Co.; Regalrez® 1018, an aromatic hydrocarbon resin with a pour point of 18° C., available from Hercules, Inc. (Chicago, Ill.); and Sylvatac® 5N, a modified rosin ester with a pour point of 5° C., available from Arizona Chemical Co. (Panama City, Fla.).

Tackifying resin which are predominantly aliphatic are known to associate primarily with the mid-block portion of a block copolymer. As the aromaticity of resin increases, the resin will tend to become increasing compatible with the end-block of a block copolymer. High softening point mid block compatible tackifying resins include Eastotac® E, R, L and W series, cycloaliphatic hydrocarbon resins having varying degrees of hydrogenation available in softening points of 100° C., 115° C., 130° C. and 140° C., a supplied by Eastman Chemical Co.; Escorez® 5400 series as well as styrenated and high softening point dicyclopentadiene based resins from Exxon Chemical Co. and Regalrez® T-140 available from Hercules, Inc., and 140° C. softening point rosin ester available from Union Camp.

Examples of useful aromatic tackifying resins include the Endex® series of resins, manufactured as a copolymer of modified styrene with softening points ranging from 152° C. to 160° C. and the Kristalex® series of alpha-methyl styrene resins ranging in softening point from 70° C. to 140° C., both available from Hercules, Inc. (Wilmington, Del.); as well as polyphenylene ether, particularly preblended with tackifying resin, and coumarone indene resins.

Mixed aliphatic-aromatic tackifying resins are typically predominantly aliphatic and are hence primarily associated with the mid-block, yet comprise aromatic constituents at amounts up to about 30 wt-% with respect to the weight of tackifying resin. Commercial examples include MBG-275 available from Hercules, Inc. and Escorez® 5600 series, available from Exxon (Houston, Tex.).

Water dispersible resins include those resins having functional groups such as hydroxyl groups (-OH), acid groups (-COOH) or ester groups (-COOR). Such resins include terpene phenolic tackifying resins such as Nirez® V-2040, rosin acid tackifying resins such as Sylvatac® 140 from Arizona Chemical Co. (no longer commercially available); Dymerex® resin, a polymerized dimer acid; as well as the DE series and Foral® series of rosin acids available from Hercules, Inc.

The hot melt pressure sensitive adhesives of the present invention may comprise a plasticizer at a concentration from 0 wt-% to about 50 wt-%. For extrudable grade HMPSAs it is preferred to minimize the concentration of liquid diluents, whereas for conventional HMPSAs applications, the compositions preferably employ about 10 wt-% to about 40 wt-% plasticizer, and more preferably from about 15 wt-% to about 30 wt-%.

A plasticizer is broadly defined as a typically organic composition that can be added to a thermoplastic composition to improve extrudability, flexibility, workability and stretchability in the finished adhesive. Any material, which flows at ambient temperatures and is compatible with the block copolymer may be useful. The plasticizers useful in the present invention may include mineral based oils and petroleum based oils, liquid resins, liquid elastomers, polybutene, polyisobutylene, functionalized oils such as glycerol trihydroxyoleate and other fatty oils and mixtures thereof. The most commonly used plasticizers are oils that are primarily hydrocarbon oils that are low in aromatic content and are paraffinic or naphthenic in character. The oils are preferably low in volatility, transparent and have as little color and odor as possible. This invention also contemplates the use of olefin oligomers, low molecular weight polymers, vegetable oils and their derivatives and similar plasticizing oils.

Examples of useful plasticizers include Calsol® 5120, a naphthenic petroleum based oil available from Calumet Lubricants Co. (Indianapolis, Ind.); Kaydol® White Mineral Oil, a paraffinic mineral oil available from Witco Corp. (NY, N.Y.); Parapol® 1300, a liquid butene homopolymer available from Exxon Chemical Co. (Houston, Tex.); Indopol® H-300, a liquid butene homopolymer, available from Amoco Corp. (Chicago, Ill.); as well as a variety of 500 second or 1200 second naphthenic process oils. These plasticizers are useful in amounts from 0 wt-% to about 50 wt-%, preferably from about 10 wt-% to about 40 wt-% and more preferably from about 10 wt-% to about 30 wt-%, for the hot melt pressure sensitive compositions.

When a solid plasticizing agent is employed, it will preferably have a softening point above 60° C. Although a 1,4-cyclohexane dimethanol dibenzoate compound commercially available from Velsicol under the trade name Benzoflex™ 352 is preferred, any solid plasticizer that will subsequently recrystallize in the compounded thermoplastic composition is suitable. Other plasticizers that may be suitable for this purpose are described in EP 0422 108 B1 and EP 0 410 412 B1, both assigned to H.B. Fuller Company.

An incremental amount of wax may be added to the adhesive composition to increase the cohesive strength and/or heat resistance at amounts from about 0.1% to about 10% by weight of the adhesive, preferably from about 2% to about 8% by weight of the adhesive and most preferably from about 4% to about 6% by weight of the adhesive. In general, the addition of wax causes the open time of the adhesive to decrease, limiting the time frame within which a bond may be formed between two substrates. The more wax, which is added, the shorter the open time becomes. Additionally, higher amounts of wax, particularly polar waxes, adversely affect the adhesion of a pressure sensitive adhesive causing a decrease in loop tack values and/or peel values. If these values become too low, the adhesive may be referred to as going "dead," which means that the tack of the adhesive has decreased to a point where the adhesive is no longer useful as a pressure sensitive adhesive.

As is known in the art, various other components can be added to modify the tack, color, odor, etc., of the thermoplastic composition. Additives such as antioxidants such as hindered phenolics (Irganox™ 1010, Irganox™ 1076), phosphites (for example, Irgafos™ 168), ultraviolet stabilizers, pigments, and fillers, can also be included in the formulations.

The pressure sensitive adhesive composition of the present invention can exhibit a spectrum of properties, including cohesively failing hot melts for resealable adhesive closures, and various removable and permanent grade tape and label applications. Example include nonwoven applications for positioning of feminine napkins, diaper fastening systems, and disposable article construction, in the automotive industry where hot melt pressure sensitive adhesives are used for assembly applications, and for medical devices and bandages.

Pressure sensitive adhesives are often times coated onto a primary substrate, covered with release liner and then shipped and stored for use at a later date. An end user will then apply the adhesive coated substrate to a secondary substrate. Examples of such applications are various labeling applications, diaper tapes, bandages and band aids and feminine napkins which are adhered to panties. Alternatively, the adhesive may be coated to a first substrate and bonded to a second substrate being the same or different than the first substrate in-line.

The invention is further illustrated by the following non-limiting examples.

EXAMPLES

Test Methods
Complex Viscosity

The complex viscosity is measured in accordance with ASTM-D4440. The parallel plates employed had a 20–25 mm diameter with a gap of about 1.5–2.0 mm. The instrument was set to a frequency of 1 Hz and a temperature sweep was performed at a step rate of 2° C./min.

Screen Retention Tendency

The complex viscosity values are correlated to a second test designed to measure the amount of film material that will pass through a screen at a certain temperature under a certain load (weight per area). A 20 mesh screen was placed over the top of a preweighed, nonmeltable container. A copper tube having a inner diameter of about 0.875" and a height of 32 mm was then placed on top of the screen. About 3.5 g of the film material (pre-finished film, pellets, or other forms) to be tested is placed on top of the screen within the copper tube at room temperature. A 100 g weight having a diameter of 0.860" is placed on top of the film material. The entire assembly is placed in a forced air oven at 300° F. for 30 minutes. The assembly is removed from the oven, cooled, and the mass of film material that passed through the screen into the container beneath is determined by subtracting the final weight from the mass of the container.

The mesh size, temperature, and load may be altered to increase the sensitivity of the test method. For example a smaller mesh size screen and/or a lower temperature and/or a lower load may be employed to differentiate and select better films in situations wherein when tested in accordance with the baseline conditions, the performance is nearly the same.

Initial Peels to Cotton

Peel values were measured in order to determine the extent the film material effects the adhesive performance. This test method describes how to measure the removal force of an adhesive surface bonded to a fabric substrate. In each of the examples, 0.2 wt-% of film was mixed with HL-2238, a commercially available pressure sensitive positioning adhesive composition available from H.B. Fuller Company, St. Paul, Minn.

Hot melt coated adhesive films on Mylar are prepared using a suitable coating device at an appropriate application temperature. During preparation of the adhesive coated films, the adhesive surface is covered with release paper to facilitate handling. The coat weight is checked targeting 25 g/m$^2$ +/−3 g/m$^2$.

The adhesive coated films are cut into 1 inch (2.5 cm) wide strips, which are 4 inches (10 cm), in length in the machine direction. At one end of each strip, fold approximately ¼ inch (0.6 cm) of the strip onto itself to create a grip. The release paper is removed and the adhesive surface of one 1 inch (2.5 cm) wide strip onto knit cotton test kit to form a composite. The composite is place on the mechanical roll-down device with 4.5 pound (2 kg) roller (Engineering Service, Glenview Ill. 60025) and the roller allowed two passes over the sample, one forward and one back. A timer is activated and the sample is placed into the jaws of a slip-peel tester (Instrumentors, Inc., Cleveland, Ohio). The 1 inch (2.5 cm) wide strip is placed into the mobile jaw and the fabric is placed in the stationary jaw. No more than 1 minute after the sample has been removed from the roll-down device, the sample is peeled at 12 inches per minute (30 cm/min), averaging over 10 seconds. The procedure is repeated five times, recording the average T-peel value and noting any legging or transfer. The T-peel values are reported in grams per linear inch.

The tradename, chemical description, supplier, density, and melt index of the film materials employed in the examples are depicted in Table 1, as follows.

TABLE 1

| Tradename | Description | Supplier | Density (g/cm$^3$) | Melt Index (MI) |
| --- | --- | --- | --- | --- |
| SM-1300 | substantially linear ethylene-octene | Dow Chemical Co. | 0.902 | 30 g/10 min @ 190° C. |
| SM-1100 | substantially linear ethylene-octene | Dow Chemical Co. | 0.880 | 18 g/10 min @ 190° C. |

TABLE 1-continued

| Tradename | Description | Supplier | Density (g/cm³) | Melt Index (MI) |
|---|---|---|---|---|
| SM-8250 | substantially linear ethylene-octene | Dow Chemical Co. | 0.885 | 30 g/10 min @ 190° C. |
| SM-8400 | substantially linear ethylene-octene | Dow Chemical Co. | 0.870 | 30 g/10 min @ 190° C. |
| Exact 4038 | homogeneous linear ethylene | Exxon Chemical Co. | 0.885 | 125 g/10 min @ 190° C. |
| EVA Film | High MI, 30% VA EVA film | Specialty Extrusion | | |
| Comparative A | | | 0.918 | 20 g/10 min @ 190° C. |
| Comparative B | | | 0.927 | 2.5 g/10 min @ 190° C. |
| Comparative C (Epolene C-10) | Ethene homopolymer | Eastman Chemical Co. | 0.906 | 2250 g/10 min @ 190° C. |

Figure 1:
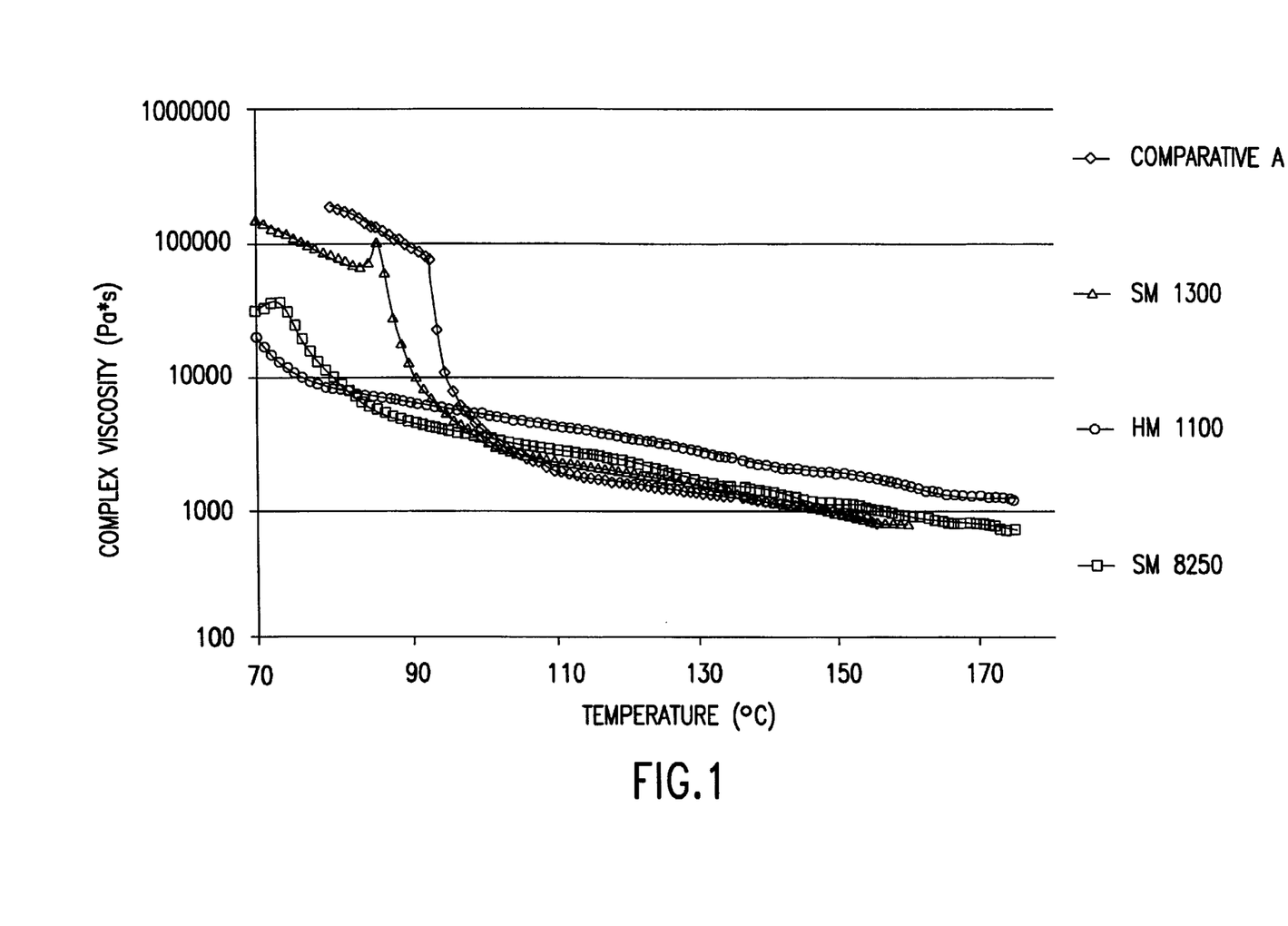

FIG. 1 depicts the complex viscosity of Comparative A in comparison to SM-1300, SM-1100, and SM-8250, three films suitable for use in the present invention, having a complex viscosity of less than 100,000 Pa*s at 90° C. Comparative Examples A and B represent films currently employed as packaging films for pressure sensitive hot melt adhesives. Comparative Example B has a complex viscosity of about 3200 Pa*s at 150° C. and a complex viscosity of greater than 100,000 Pa*s at 90° C. Hence, Comparative B has an even high complex viscosity that Comparative A and is thus, not depicted in FIG. 1

Figure 2:
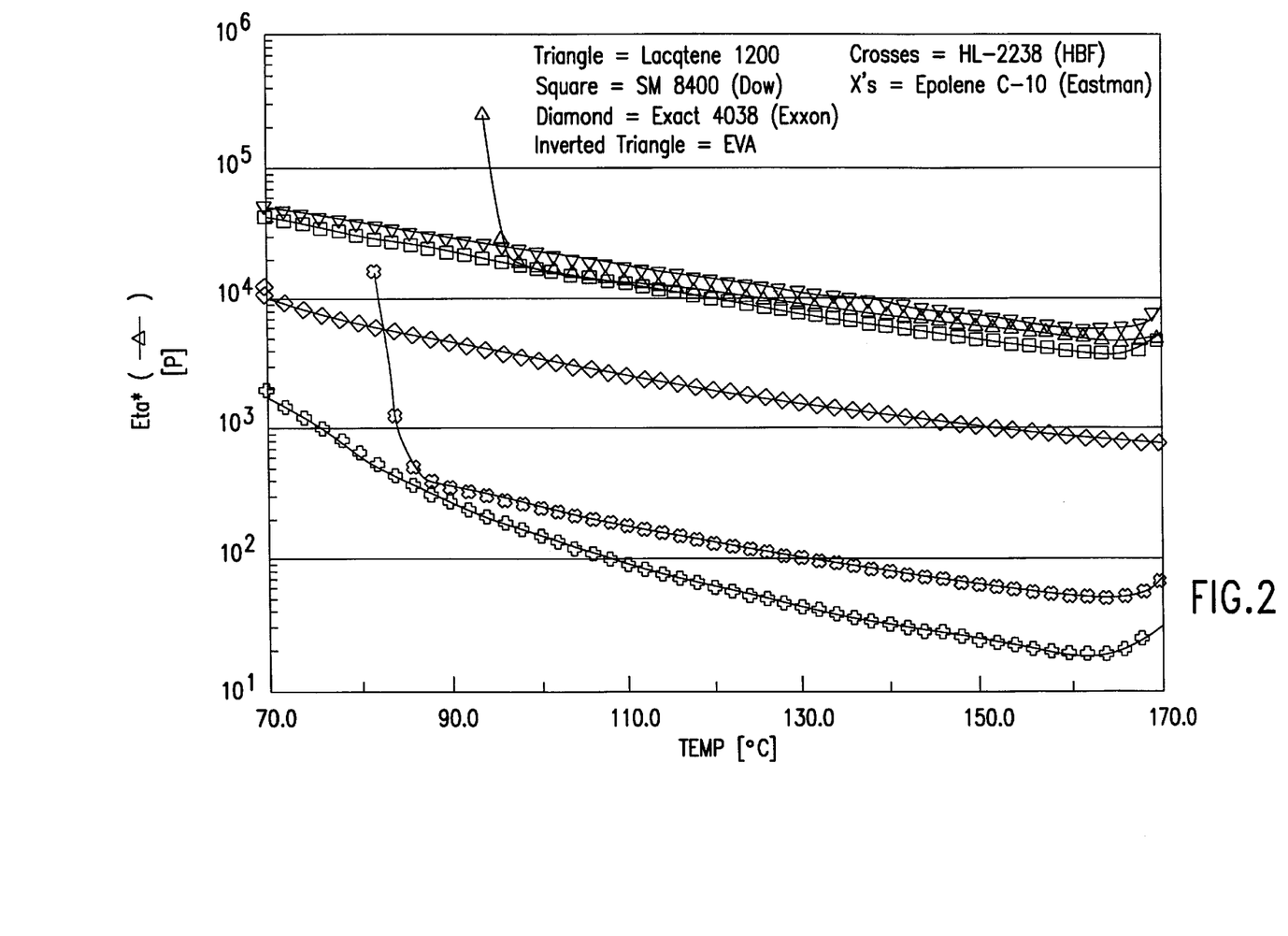

FIG. 2 depicts the complex viscosity of SM-8400, Exact 4038, andan EVA film with respect to a Comparative A, HL-2238, a commercially available pressure sensitive adhesive composition available from H.B. Fuller Company, St. Paul, Minn., and Comparative C, Epolene C-10, a polyethylene wax. Due to instrumentation differences, FIG. 2 depicts complex viscosity, in poise, rather than Pa*s, versus temperature. (1 Pa*s=10 Poise The screen retention tendencies of several of the films as well as the T-peel values of the adhesive/film mixture were tested as depicted in Table 2.

TABLE 2

| Tradename | Mass of Film (g) | T-peels to Cotton |
|---|---|---|
| SM 8400 | 2.80 | 226 g ± 114 |
| Exact 4038 | 2.56 | 242 g ± 27 |
| SM-8250 | 2.44 | |
| SM1300 | 2.23 | 236 g ± 7 |
| Control (HL-2238 without film) | | 207 g ± 27 |
| Comparative A | 0 | |
| Comparative B | 0 | |
| Comparative C (Epolene C-10) | 2.30 | 216 ± 19 g |

Although neither Comparative Example A, nor Comparative Example B were sufficiently low enough in complex viscosity to pass through the screen and descend into the container positioned below, there was a notable difference in the test results between these samples. Whereas Comparative Example A passed through yet remained attached to the screen, Comparative Example B maintained the cylindrical shape of the copper tubing and only penetrated through the screen 1–2 mm. Surprisingly, the films exemplified for use in the present invention have screen retention values similar to Epolene C-10, that has a melt index of 2250 g/10min at 190° C. Further, the applicants surmise that lower temperatures and higher mesh screens conditions would result in an even greater differentiation among the low complex viscosity films employed in the present invention.

SM-1300, SM-8250 & SM-8400 all have a melt index of 30 g/10 min., yet differ with respect to density. Although all three films exhibit the desired complex viscosity and lack a sharp increasing inflection at a temperature between 90° C. and 100° C., as in the case of Comparative Examples A and C, the lowest density film results in the least screen retention tendencies.

Exact 4038 and SM-8250 have the same density, yet differ with respect to melt index. The higher melt index film exhibits the lowest complex viscosity and the least screen retention tendencies. However, the density appears to have a greater impact than melt index, since the SM-8400, having a lower density, yet lower melt index, exhibited the best results.

What is claimed is:

1. A method of packaging a thermoplastic composition, said method comprising the steps of:

a) providing a thermoplastic composition;

b) selecting a plastic packaging material having physical characteristics which are compatible with and do not substantially adversely affect the characteristics of said thermoplastic composition; and c) substantially surrounding the thermoplastic composition with said plastic packaging material;

wherein the difference between the complex viscosity of the thermoplastic composition and the complex viscosity of the plastic packaging material is less than about 15,000 poise at a temperature ranging from about 100° C. to about 150° C.

2. The method of claim 1 wherein said plastic packaging material has a melt index at 190° C. of greater than 20 g/10 min.

3. The method of claim 1 wherein said plastic packaging material has a melt index at 190° C. of greater than 30 g/10 min.

4. The method of claim 1 wherein said wherein said plastic packaging material comprises at least one homogeneous ethylene/α-olefin interpolymers.

5. The method of claim 1 wherein said plastic packaging material has a density less than about 0.890 g/cm³.

6. A method of packaging a thermoplastic composition, said method comprising the steps of:

a.) providing a tacky mass of thermoplastic composition having an outer surface;

b.) coating the outer surface of said mass with a thermoplastic coating composition by:

i) dispensing said thermoplastic coating composition as a continuous film from a coating device;

ii) suspending said film between the coating device and the outer surface of the mass to be coated; and iii) contacting said film with said outer surface;

wherein the difference between the complex viscosity of the thermoplastic composition and the complex viscosity of the thermoplastic coating composition is less than about 15,000 poise at a temperature ranging from about 100° C. to about 150° C.

7. The method of claim 6 wherein said thermoplastic coating composition comprises a metallocene polyolefin.

8. The method of claim 6 wherein said plastic packaging material has a melt index at 190° C. of greater than 20 g/10 min.

9. The method of claim 6 wherein said plastic packaging material comprises at least one homogeneous ethylene/α-olefin interpolymers.

10. The method of claim 6 wherein said plastic packaging material has a density less than about 0.890 g/cm³.

11. A method of packaging a thermoplastic composition, said method comprising the steps of:

a) providing a thermoplastic composition in molten form;

b) selecting a plastic packaging material wherein said thermoplastic composition and said packaging material have a difference in complex viscosity of less than 15,000 poise at the application temperature of said thermoplastic composition; and c) substantially surrounding said thermoplastic composition with said plastic packaging material.

12. The method of claim 11 further comprising sealing said plastic packaging material around said thermoplastic composition in molten form.

13. The method of claim 11 wherein said plastic packaging material has a melt index at 190° C. of greater than 20 g/10 min.

14. The method of claim 11 wherein said plastic packaging material comprises at least one homogeneous ethylene/α-olefin interpolymers.

15. The method of claim 11 wherein said plastic packaging material has a density less than about 0.890 g/cm³.

16. A method of packaging a thermoplastic composition, said method comprising the steps of:

a) providing a thermoplastic composition;

b) selecting a plastic packaging material having physical characteristics which are compatible with and do not substantially adversely affect the characteristics of said thermoplastic composition; and c) substantially surrounding the thermoplastic composition with said plastic packaging material;

wherein the difference between the complex viscosity of said thermoplastic composition and the complex viscosity of said plastic packaging material is less than about 15,000 poise at the application temperature of said thermoplastic composition.

17. The method of claim 16 wherein said plastic packaging material comprises at least one homogeneous ethylene/α-olefin interpolymers.

18. The method of claim 16 wherein said complex viscosity of said plastic packaging material at about 80° C. is less than 10,000 Pa*s.

19. The method of claim 16 wherein said thermoplastic composition is a hot melt adhesive.

20. The method of claim 16 wherein said plastic packaging material has a melt index at 190° C. of greater than 20 g/10 min.

21. The method of claim 16 wherein said plastic packaging material has a density less than about 0.910 g/cm³.

22. The method of claim 16 wherein said plastic packaging material has a density less than about 0.900 g/cm³.

23. The method of claim 16 wherein said plastic packaging material has a density less than about 0.890 g/cm³.

24. The method of claim 16 wherein said plastic packaging material has a density less than about 0.885 g/cm³.

25. The method of claim 16 wherein said plastic packaging material has a melt index at 190° C. of greater than 30 g/10 min.

* * * * *